(12) United States Patent
Kasajima et al.

(10) Patent No.: US 6,972,929 B2
(45) Date of Patent: Dec. 6, 2005

(54) COIL CONDUCTOR WITH TRACE CONDUCTORS FOR A THIN-FILM MAGNETIC HEAD

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 69 days.

(21) Appl. No.: 10/649,740

(22) Filed: Aug. 28, 2003

(65) Prior Publication Data

US 2004/0042119 A1    Mar. 4, 2004

(30) Foreign Application Priority Data

Aug. 30, 2002    (JP) .............................. 2002-253139

(51) Int. Cl.[7] .................................................. G11B 5/17
(52) U.S. Cl. ..................................................... 360/123
(58) Field of Search ................................ 360/123, 124, 360/126, 317

(56) References Cited

U.S. PATENT DOCUMENTS 5,754,369 A * 5/1998 Balakrishnan ........... 360/264.2
6,205,998 B1 * 3/2001 Winston ..................... 126/692
6,771,463 B2 * 8/2004 Kamijima ................... 360/123

* cited by examiner

Primary Examiner—Jefferson Evans
(74) Attorney, Agent, or Firm—Buchanan Ingersoll PC

(57) ABSTRACT

A thin-film magnetic head includes an insulation gap, a pair of yoke layers with one ends and the other ends, respectively, the one ends constituting magnetic poles separated with each other by the insulation gap, the other ends being magnetically coupled with each other, a coil conductor wound around at least one of the pair of yoke layers, first and second trace conductors with one ends electrically connected to both ends of the coil conductor, respectively, and first and second connection bumps electrically connected to the other ends of the first and second trace conductors, respectively. The first trace conductor includes a lower conductor layer and an upper conductor layer connected in parallel with each other, the second trace conductor including a lower conductor layer and an upper conductor layer connected in parallel with each other. The upper conductor layer of the first trace conductor and the lower conductor layer of the second trace conductor are arranged from top to bottom to face to each other. The upper conductor layer of the second trace conductor and the lower conductor layer of the first trace conductor are arranged from top to bottom to face to each other.

5 Claims, 9 Drawing Sheets

COIL CONDUCTOR WITH TRACE CONDUCTORS FOR A THIN-FILM MAGNETIC HEAD

FIELD OF THE INVENTION

The present invention relates to a thin-film magnetic head element provided with an inductive write head element.

DESCRIPTION OF THE RELATED ART

Such a thin-film magnetic head has a yoke magnetically coupled with two magnetic poles separated from each other by a recording gap, a coil wound around the yoke, a pair of trace conductors electrically connected to the coil, and connection bumps electrically connected to the pair of trace conductors. Write operation of magnetic information is performed by flowing a write current through the coil via the connection bumps and the trace conductors.

The write current applied to the coil is in general rectangular wave shape pulses. Wave shape and magnitude of current actually flowing through the coil when the rectangular wave shape pulses are applied vary depending upon structure of the thin-film magnetic head, upon an output impedance of a current source connected with the coil, and upon a frequency and a voltage of the applied rectangular wave pulses. These are affected also by a characteristic impedance of trace conductors and connection lines between the current source and the magnetic head.

If the wave shape of current flowing through the inductive write head element of the thin-film magnetic head is deformed, magnetic patterns written in a magnetic medium will become distorted and thus write and read operations of data will become difficult. Also, in order to improve the non-linear transition shift (NLTS) in dynamic characteristics, it is necessary to shorten a rising time of the wave shape of current flowing through the coil.

Therefore, required for the wave shape of current flowing through the coil are (1) to maintain a profile of the rectangular wave shape pulses provided from the current source as much as possible, (2) to have a short rising time, and (3) to have a high current value while holding the rectangular wave shape in order to obtain a strong write magnetic field.

These requirements (1)–(3) may be satisfied by decreasing the coil inductance at the frequency of the write current. However, if the number of turns of the coil is reduced to decrease the inductance, magnetic force generated from the coil will decrease causing no improvement of the characteristics. Also, if the size of the coil is reduced by narrowing a coil pitch, difficulty in fabrication of the coil and problems of heating may occur.

SUMMARY OF THE INVENTION

It is therefore an object of the present invention to provide a thin-film magnetic head, whereby a coil inductance can be reduced without inviting difficulty in manufacturing and deterioration in characteristics.

According to the present invention, a thin-film magnetic head includes an insulation gap, a pair of yoke layers with one ends and the other ends, respectively, the one ends constituting magnetic poles separated with each other by the insulation gap, the other ends being magnetically coupled with each other, a coil conductor wound around at least one of the pair of yoke layers, first and second trace conductors with one ends electrically connected to both ends of the coil conductor, respectively, and first and second connection bumps electrically connected to the other ends of the first and second trace conductors, respectively. The first trace conductor includes a lower conductor layer and an upper conductor layer connected in parallel with each other, the second trace conductor including a lower conductor layer and an upper conductor layer connected in parallel with each other. The upper conductor layer of the first trace conductor and the lower conductor layer of the second trace conductor are arranged from top to bottom to face to each other. The upper conductor layer of the second trace conductor and the lower conductor layer of the first trace conductor are arranged from top to bottom to face to each other.

The magnetic fields counter with each other between the lower conductor layer of the first trace conductor and the upper conductor layer of the second trace conductor and also between the lower conductor layer of the second trace conductor and the upper conductor layer of the first trace conductor to greatly decrease stray inductances caused by the currents. On the other hand, due to the reversed current flowing, the electrical fields strengthen with each other between the lower conductor layer of the first trace conductor and the upper conductor layer of the second trace conductor and also between the lower conductor layer of the second trace conductor and the upper conductor layer of the first trace conductor to increase stray capacitances. Thus, the stray inductance of the trace conductors connected to the coil conductor can be decreased. Therefore, it is possible to flow a write current having a short rising time and a high current value through the coil conductor with maintaining a profile of rectangular wave shape input pulses as much as possible. Due to the short rising time, correct writing operations can be expected even if the write frequency is high as 300 MHz for example. Of course, since no change nor modification of the shape and size of the coil conductor is required, no difficulty in manufacturing and no deterioration in characteristics will be invited.

It is preferred that the upper conductor layer of the first trace conductor and the upper conductor layer of the second trace conductor are arranged from side to side, and that the lower conductor layer of the first trace conductor and the lower conductor layer of the second trace conductor are arranged from side to side.

It is also preferred that the first and second trace conductors are formed substantially in line to connect the coil conductor with the first and second connection bumps. By this configuration, the length of the first and second trace conductors can be shortened resulting the stray inductance to decrease accordingly.

It is further preferred that the upper conductor layer of the first trace conductor and the upper conductor layer of the second trace conductor are exposed outside. If the length of the first and second trace conductors is shortened, the stray capacitance will increase. However, if exposed outside, the dielectric constant at the upper surfaces of the upper conductor layers will decrease to nearly 1.0 and thus the stray capacitance will decrease accordingly.

It is preferred that the first and second trace conductors are surrounded by a low dielectric constant material. The stray capacitance decreases with decreasing of the dielectric constant.

Further objects and advantages of the present invention will be apparent from the following description of the preferred embodiments of the invention as illustrated in the accompanying drawings.

DESCRIPTION OF THE PREFERRED EMBODIMENTS

Figure 1:
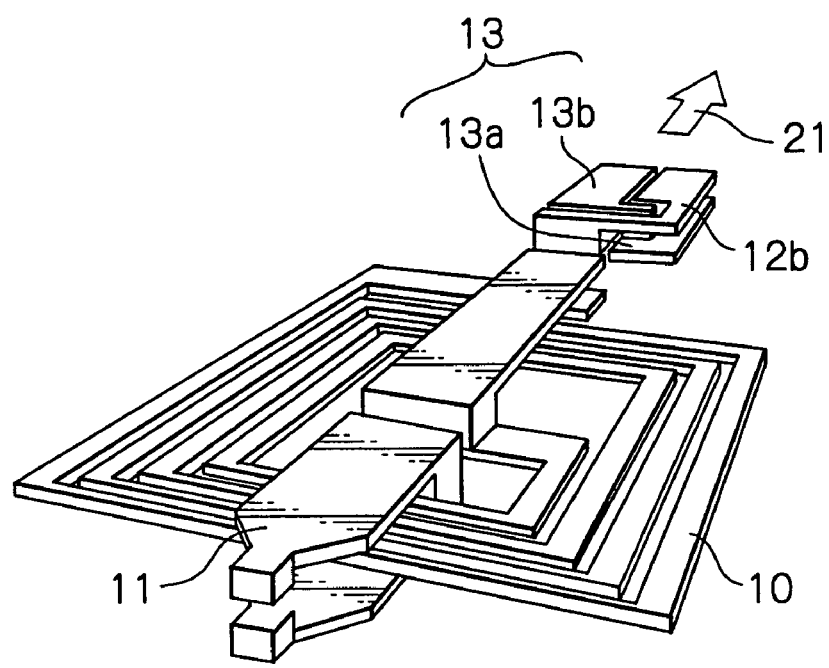
FIG. 1 shows an oblique view illustrating a simple partial configuration of yoke layers, a coil conductor and trace conductors of a thin-film magnetic head as a preferred embodiment according to the present invention.
Figure 2:
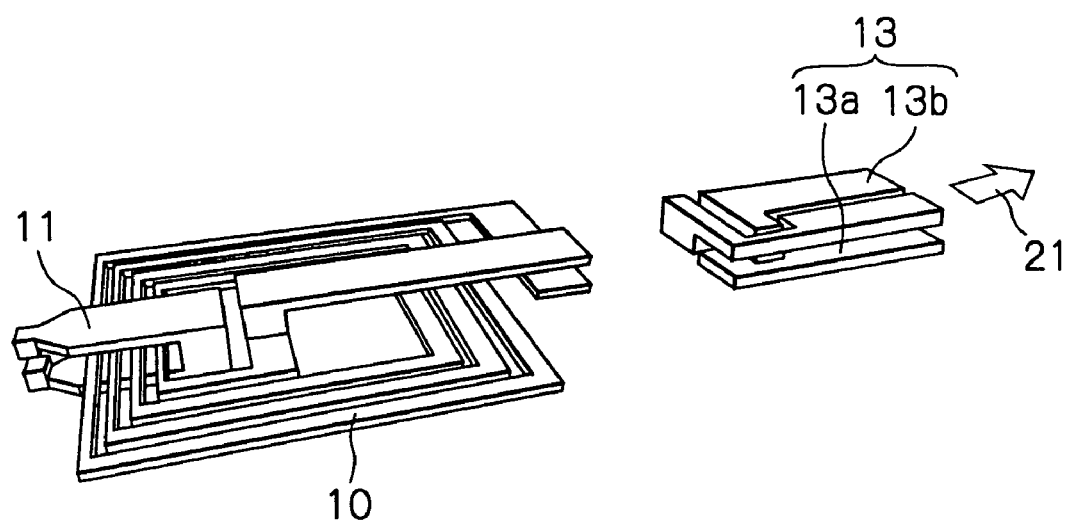
FIG. 2 shows an oblique view, seen from a different direction from FIG. 1, illustrating the partial configuration of the yoke layers, the coil conductor and the trace conductors of the thin-film magnetic head in the embodiment of FIG. 1.
Figure 3:
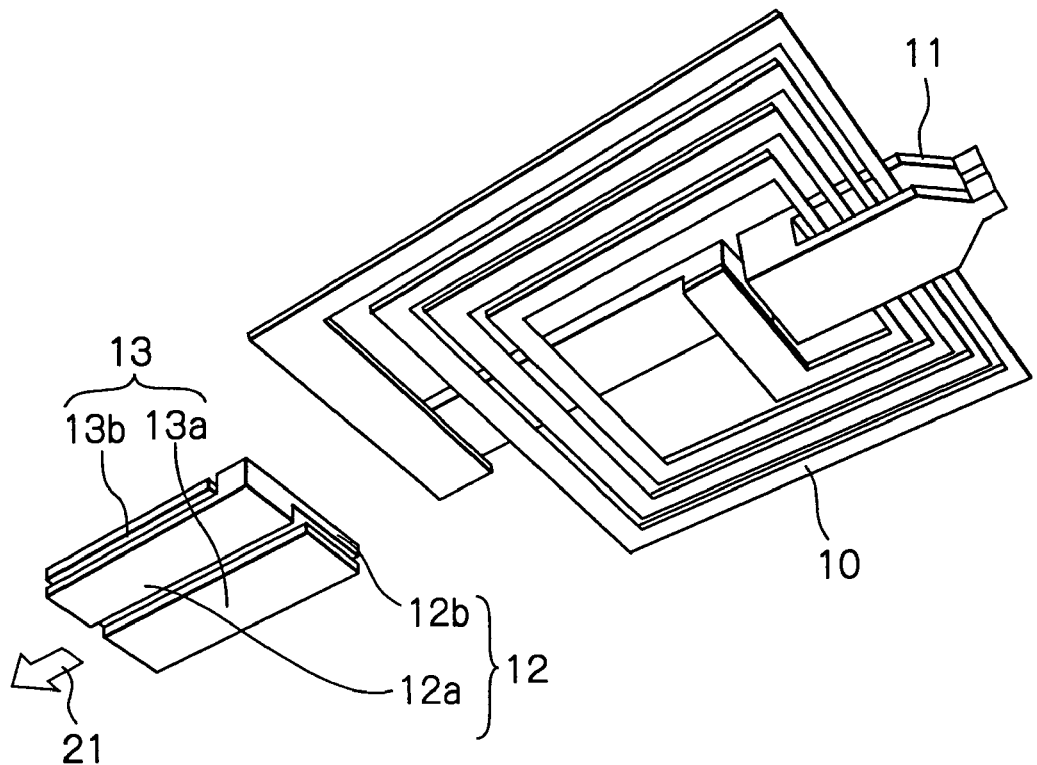
FIG. 3 shows an oblique view, seen from a further different direction from FIG. 1, illustrating the partial configuration of the yoke layers, the coil conductor and the trace conductors of the thin-film magnetic head in the embodiment of FIG. 1.
Figure 4:
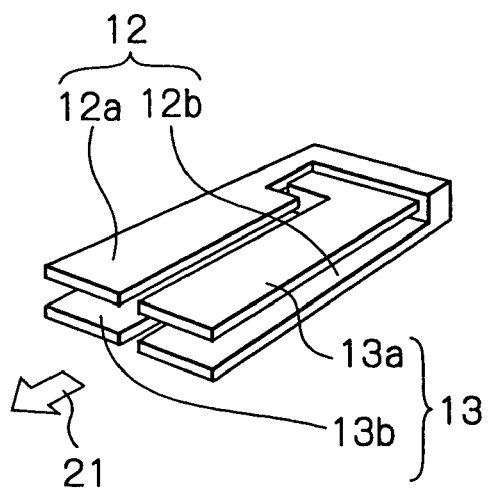
FIG. 4 shows an oblique view, seen from a different direction from FIG. 3, illustrating a partial configuration of the trace conductors in the embodiment of FIG. 1.
Figure 5:
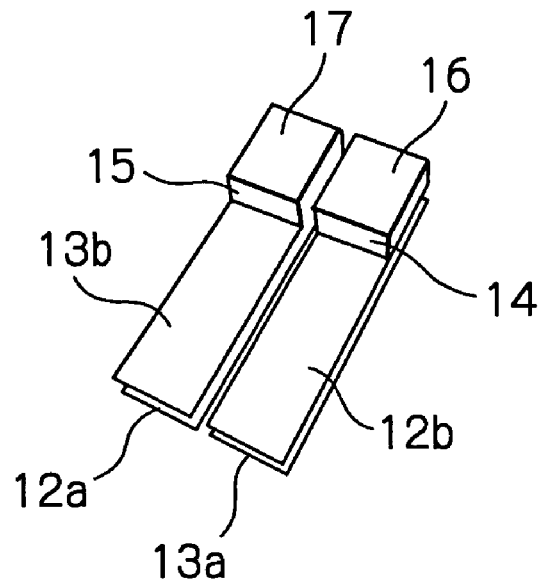
FIG. 5 shows an oblique view illustrating another configuration of the trace conductors in the embodiment of FIG. 1.
Figure 6:
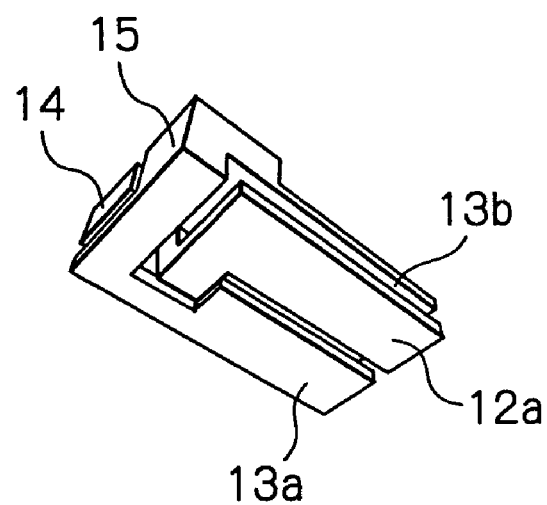
FIG. 6 shows an oblique view, seen from a different direction from FIG. 5, illustrating another configuration of the trace conductors in the embodiment of FIG. 1.
Figure 7:
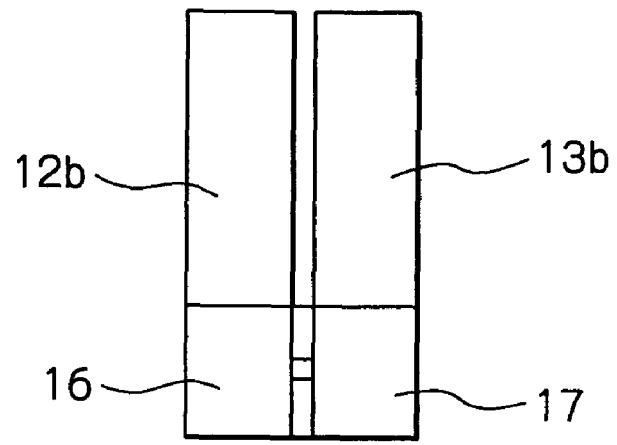
FIG. 7 shows a top view illustrating another configuration of the trace conductors in the embodiment of FIG. 1.
Figure 8:
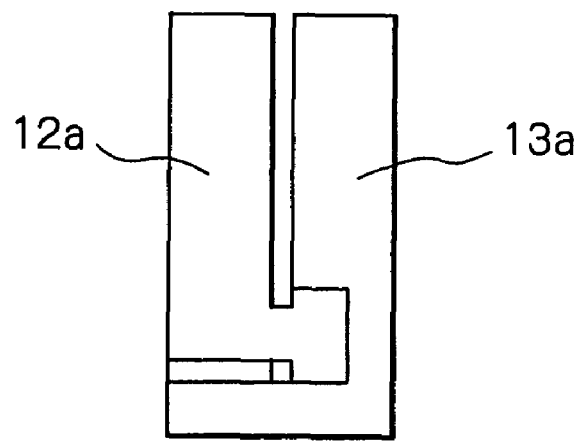
FIG. 8 shows a bottom view illustrating another configuration of the trace conductors in the embodiment of FIG. 1.
Figure 9:
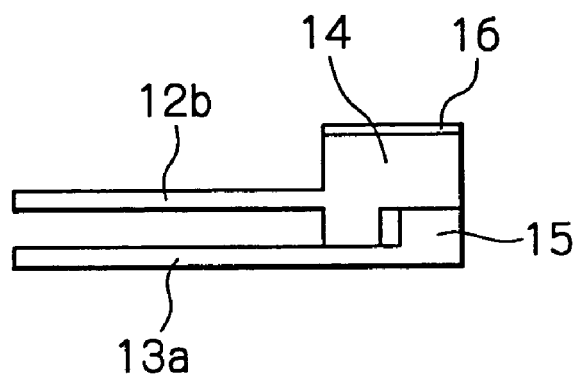
FIG. 9 shows one side view illustrating another configuration of the trace conductors in the embodiment of FIG. 1.
Figure 10:
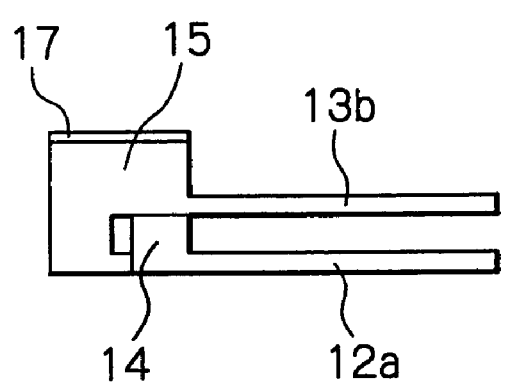
FIG. 10 shows the other side view illustrating another configuration of the trace conductors in the embodiment of FIG. 1.
Figure 11:
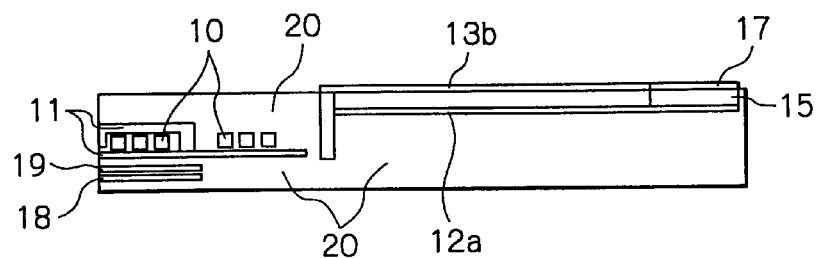
FIG. 11 shows a sectional view illustrating the whole configuration of the thin-film magnetic head in the embodiment of FIG. 1.

FIG. 1 illustrates a simple partial configuration of yoke layers, a coil conductor and trace conductors of a thin-film magnetic head as a preferred embodiment according to the present invention, FIG. 2 illustrates the partial configuration of the yoke layers, the coil conductor and the trace conductors of the thin-film magnetic head in this embodiment, seen from a different direction from FIG. 1, FIG. 3 illustrates the partial configuration of the yoke layers, the coil conductor and the trace conductors of the thin-film magnetic head in this embodiment, seen from a further different direction from FIG. 1, FIG. 4 illustrates a partial configuration of the trace conductors in this embodiment, seen from a different direction from FIG. 3, FIG. 5 illustrates another configuration of the trace conductors in FIG. 6 illustrates another configuration of the trace conductors in this embodiment, seen from a different direction from FIG. 5, FIG. 7 illustrates a top view of another configuration of the trace conductors in this embodiment, FIG. 8 illustrates a bottom view of another configuration of the trace conductors in this embodiment, FIG. 9 illustrates one side view of another configuration of the trace conductors in this embodiment, FIG. 10 illustrates the other side view of another configuration of the trace conductors in this embodiment, and FIG. 11 illustrates the whole configuration of the thin-film magnetic head in this embodiment.

In FIGS. 1 to 10, reference numeral 10 denotes the coil conductor, made of an electrically conductive material such as copper for example, in a write head element of the thin-film magnetic head, 11 denotes a pair of yoke layers made of a ferromagnetic material such as permalloy and provided at its top ends with a pair of magnetic poles facing each other via an insulation gap and rear ends magnetically coupled with each other, 12 and 13 denote first and second trace conductors, made of an electrically conductive material such as copper for example, with one ends respectively connected to both ends of the coil conductor 10, 14 and 15 denote first and second connection bumps respectively and electrically connected to the other ends of the first and second trace conductors 12 and 13, and 16 and 17 denote connection electrodes or connection pads made of a gold for example and formed on the first and second connection bumps 14 and 15, respectively.

In FIG. 11, also reference numerals 18 and 19 denote lower and upper shield layers between which a magnetoresistive effect (MR) layer not shown is formed via insulation gap layers, and 20 denotes an insulation layer. The thin-film magnetic head in this embodiment is a composite thin-film magnetic head with an inductive write head element and an MR read head element. Of course, the present invention can be adopted to a thin-film magnetic head with only an inductive write head element.

The coil conductor 10 and the pair of yoke layers 11 may have configurations similar to that in a conventional thin-film magnetic head. In FIGS. 1 to 3, the coil conductor 10 is illustrated to have a plurality of turns each wound in a rectangular shape. However, the coil conductor 10 will be actually wound in a curved shape such as a circular shape or an ellipse shape.

The first and second trace conductor 12 and 13 have first sections shown in FIGS. 1 to 4 and electrically connected with the coil conductor 10, and a second sections shown in FIGS. 5 to 10 and electrically connected with the first and second bumps 14 and 15. The second sections shown in FIGS. 5 to 10 are located in a direction of an arrow 21 from the first sections shown in FIGS. 1 to 4, and these first sections and second sections are connected with each other in line. Although it is illustrated in FIGS. 1 to 3 that the first sections of the first and second trace conductor 12 and 13 and both ends of the coil conductor 10 are separated from each other, these are actually connected with each other.

The first trace conductor 12 is substantially constituted by a lower conductor layer 12*a* and an upper conductor layer 12*b* connected in parallel with each other, and the second trace conductor 13 is substantially constituted by a lower conductor layer 13a and an upper conductor layer 13b connected in parallel with each other. The upper conductor layer 12b of the first trace conductor 12 and the lower conductor layer 13a of the second trace conductor 13 are arranged from top to bottom to face each other in parallel. The upper conductor layer 13b of the second trace conductor 13 and the lower conductor layer 12a of the first trace conductor 12 are also arranged from top to bottom to face each other in parallel. The upper conductor layer 12b of the first trace conductor 12 and the upper conductor layer 13b of the second trace conductor 13 are arranged from side to side and the lower conductor layer 12a of the first trace conductor 12 and the lower conductor layer 13a of the second trace conductor 13 are also arranged from side to side. Therefore, in a sectional plane of the axes of these four conductor layers 12a, 13a, 12b and 13b, currents in the opposite direction from each other will flow through neighboring conductor layers from up to down and from side to side.

Figure 12:
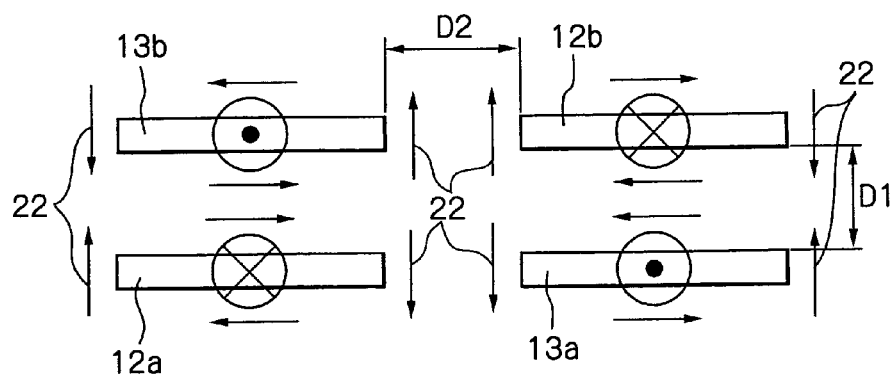
FIG. 12 illustrates operations of the embodiment of FIG. 1.

FIG. 12 shows a section seen along the axes of these four conductor layers 12a, 13a, 12b and 13b to illustrate operations of this embodiment.

Through the lower conductor layer 12a and the upper conductor layer 12b of the first trace conductor 12, current flows from frontward to backward in the figure, and conversely through the lower conductor layer 13a and the upper conductor layer 13b of the second trace conductor 13, current flows from backward to frontward in the figure. Due to the current, a magnetic field indicated by an arrow 22 in the figure is induced around each conductor layer. These magnetic fields counter with each other between the lower conductor layer 12a and the upper conductor layer 13b and also between the lower conductor layer 13a and the upper conductor layer 12b to greatly decrease stray inductances caused by the currents. On the other hand, due to the reversed current flowing, the electrical fields strengthen each other between the lower conductor layer 12a and the upper conductor layer 13b and also between the lower conductor layer 13a and the upper conductor layer 12b to increase stray capacitances.

The stray capacitance can be controlled to prevent increasing excessively by adjusting a sectional shape of the conductor layer, a width and a length of the conductor layer, relative positions of the lower conductor layer and the upper conductor layer, a vertical space D1 between the lower conductor layer and the upper conductor layer, a horizontal space D2 between the lower conductor layers or between the upper conductor layers, or combination of the conductor layers and normal conductors traveling in parallel with these conductor layers. This stray capacitance also varies depending upon a dielectric constant of the material surrounding the conductor layers. For example, if the upper conductor layer 12b of the first trace conductor 12 and the upper conductor layer 13b of the second trace conductor 13 are exposed at the surface of the insulation layer, the dielectric constant at the upper surfaces of the upper conductor layers decreases to nearly 1.0 and thus the stray capacitance decreases accordingly. The stray capacitance will also decrease if the insulation layer around the conductor layers is formed by a material with a lower dielectric constant such as a resist material or a polyimide.

The stray inductance can be controlled to greatly decrease by forming the first and second trace conductors 12 and 13 in line and by shortening their length.

By decreasing the stray inductance and by properly adjusting the stray capacitance, it is possible to flow a write current having a short rising time and a high current value through the coil conductor while maintaining a profile of rectangular wave shape input pulses as much as possible. Due to the short rising time, correct writing operations can be expected even if the write frequency is as high as 300 MHz for example.

Figure 13:
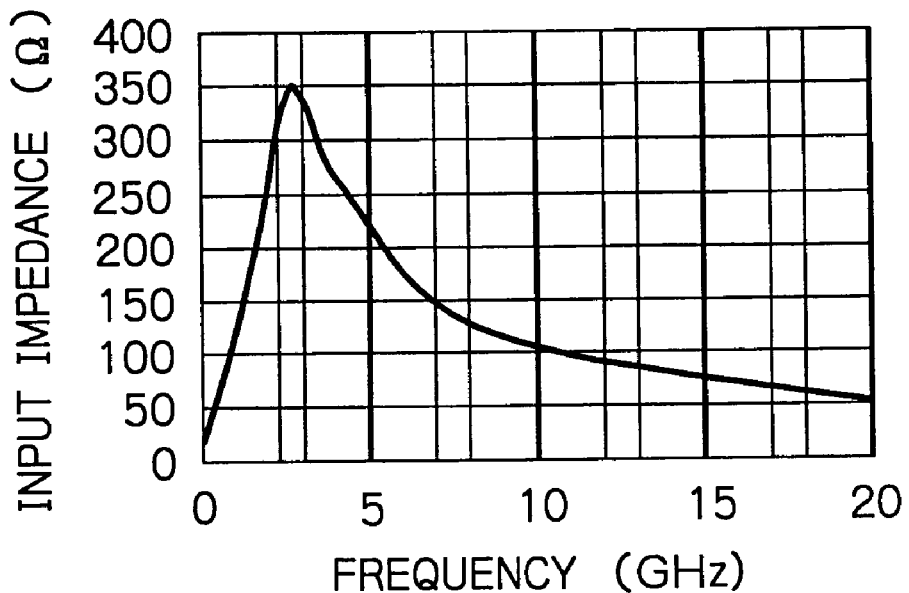
FIG. 13 shows a graph illustrating characteristics of actually measured input impedance versus frequency with respect to a conventional thin-film magnetic head.
Figure 14:
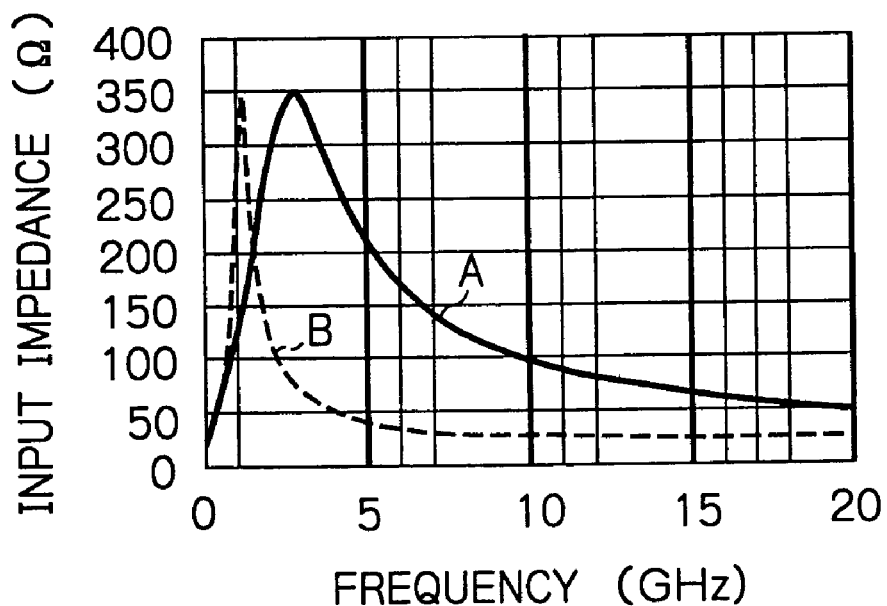
FIG. 14 shows a graph illustrating characteristics of input impedance versus frequency with respect to two equivalent circuits.

FIG. 13 illustrates characteristics of actually measured input impedance versus write frequency with respect to a conventional thin-film magnetic head. As will be noted from the figure, according to the conventional magnetic head, when the write frequency increases, the input impedance thereof rises abruptly to its peak value and then gradually falls. an equivalent circuit. However, an equivalent circuit with a profile B of the input impedance characteristics shown in FIG. 14, rises abruptly to its peak value and also falls abruptly from the peak value. The latter equivalent circuit has the same inductance but a larger capacitance with respect to the former equivalent circuit. These inductance and capacitance correspond to the stray inductance and the stray capacitance of the first and second trace conductors, respectively.

Figure 15:
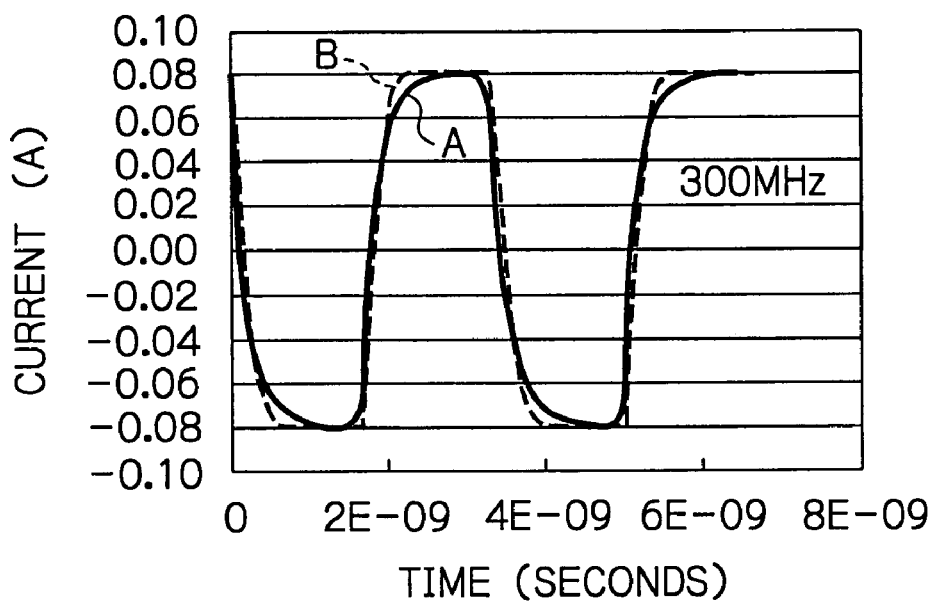
FIG. 15 shows a graph illustrating characteristics of current waveform when rectangular shaped pulses of 300 MHz are applied to the two equivalent circuits.
Figure 16:
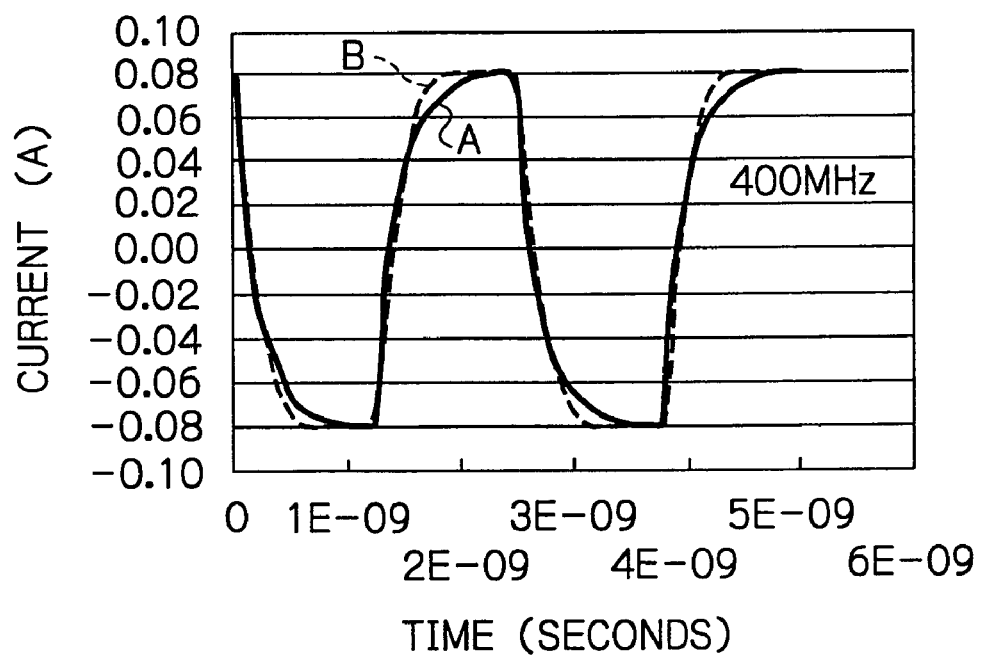
FIG. 16 shows a graph illustrating characteristics of current waveform when rectangular shaped pulses of 400 MHz are applied to the two equivalent circuits.

FIGS. 15 and 16 illustrate current waveforms when rectangular shaped pulses of 300 MHz and 400 MHz are applied to these two equivalent circuits, respectively.

As will be understood from these figures, the rising time of the profile B that has a shaper peak of the input impedance than the profile A is shorter than that of the profile A although the peak value is slightly shifted to a lower frequency side in the profile B.

Therefore, according to this embodiment, since the stray inductance is decreased and the stray capacitance is properly adjusted, it is possible to flow a write current having a short rising time and a high current value through the coil conductor while maintaining a profile of rectangular wave shape input pulses as much as possible.

Figure 17:
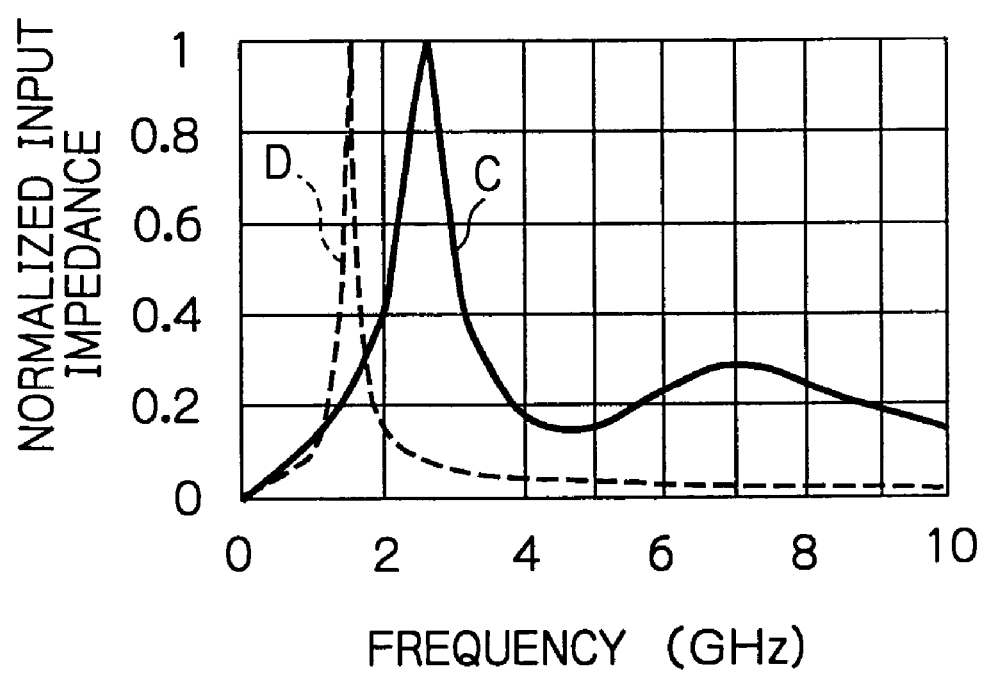
FIG. 17 shows a graph illustrating characteristics of input impedance versus frequency with respect to a case where first and second trace conductors are constituted by two conductor layers arranged in parallel with a plane as the conventional art and to a case where first and second trace conductors are constituted by four conductor layers arranged as the embodiment of FIG. 1.

FIG. 17 illustrates characteristics of input impedance versus frequency with respect to a case (profile C) where first and second trace conductors are constituted by two conductor layers arranged in parallel with a plane as the conventional art and to a case (profile D) where first and second trace conductors are constituted by four conductor layers arranged as in this embodiment.

As will be apparent from the figure, in the constitution of this embodiment, because the stray inductance is decreased and the stray capacitance is increased, a profile with an extremely sharp peak can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head comprising:
   an insulation gap;
   a pair of yoke layers with one ends and the other ends, respectively, said one ends constituting magnetic poles separated with each other by said insulation gap, said the other ends being magnetically coupled with each other;
   a coil conductor wound around at least one of said pair of yoke layers;
   first and second trace conductors with one ends electrically connected to both ends of said coil conductor, respectively; and
   first and second connection bumps electrically connected to the other ends of said first and second trace conductors, respectively, said first trace conductor including a lower conductor layer and an upper conductor layer connected in parallel with each other, said second trace conductor including a lower conductor layer and an upper conductor layer connected in parallel with each other, said upper conductor layer of said first trace conductor and said lower conductor layer of said second trace conductor being arranged from top to bottom to face to each other, and said upper conductor layer of said second trace conductor and said lower conductor layer of said first trace conductor being arranged from top to bottom to face to each other.

2. The thin-film magnetic head as claimed in claim 1, wherein said upper conductor layer of said first trace conductor and said upper conductor layer of said second trace conductor are arranged from side to side, and wherein said lower conductor layer of said first trace conductor and said lower conductor layer of said second trace conductor are arranged from side to side.

3. The thin-film magnetic head as claimed in claim 1, wherein said first and second trace conductors are formed substantially in line to connect said coil conductor with said first and second connection bumps.

4. The thin-film magnetic head as claimed in claim 1, wherein said upper conductor layer of said first trace conductor and said upper conductor layer of said second trace conductor are exposed for connection to external circuitry.

5. The thin-film magnetic head as claimed in claim 1, wherein said first and second trace conductors are surrounded by a low dielectric constant material.

* * * * *